United States Patent [19]

Roggenbuck

[11] Patent Number: 5,525,178
[45] Date of Patent: Jun. 11, 1996

[54] PROCESS FOR BINDING DRAIN TILE

[76] Inventor: Carl Roggenbuck, 8271 Ramsey Rd., Port Hope, Mich. 48468

[21] Appl. No.: 395,807

[22] Filed: Feb. 28, 1995

[51] Int. Cl.⁶ .................................................. B65D 85/64
[52] U.S. Cl. ........................... 156/244.13; 156/244.22; 156/296; 206/389; 242/173
[58] Field of Search ............................. 156/244.22, 292, 156/296, 344, 247, 244.13; 206/389; 242/173, 532.3, 172

[56] References Cited

U.S. PATENT DOCUMENTS

| | | | |
|---|---|---|---|
| 2,175,045 | 10/1939 | Vogel | 206/389 |
| 2,449,731 | 9/1948 | Therrien. | |
| 2,780,352 | 8/1954 | Schroeder | 206/389 |
| 2,973,911 | 3/1961 | Rayburn | 206/389 X |
| 3,264,828 | 8/1966 | Harpold. | |
| 4,254,173 | 3/1981 | Peer, Jr.. | |
| 4,593,815 | 6/1986 | Wright | 242/173 X |

FOREIGN PATENT DOCUMENTS 1037295  5/1965  United Kingdom ................... 206/389

Primary Examiner—Michael W. Ball
Assistant Examiner—Sam Chuan Yao
Attorney, Agent, or Firm—Weintraub DuRoss & Brady

[57] ABSTRACT

A coil of hollow tubing is bonded onto itself to retain the integrity of the coil by depositing a bead or stream of adhesive onto the exterior of the tubing along the extent thereof. By coiling the tubing the adhesive comes into contact with itself to removably bond the coil together. In use, any desired section of the coil is "peeled" from the remainder of the coil. The present invention is particularly advantageous in use with drain tile.

5 Claims, 1 Drawing Sheet

FIG 1
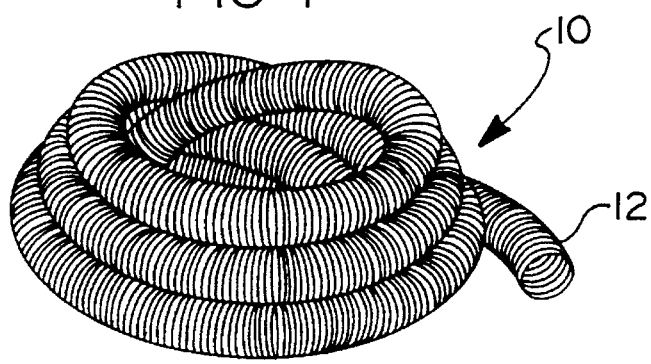
FIG 2
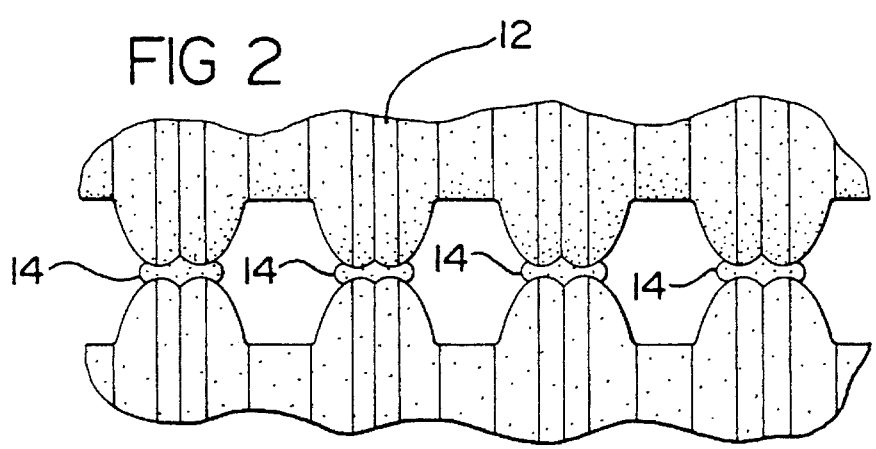
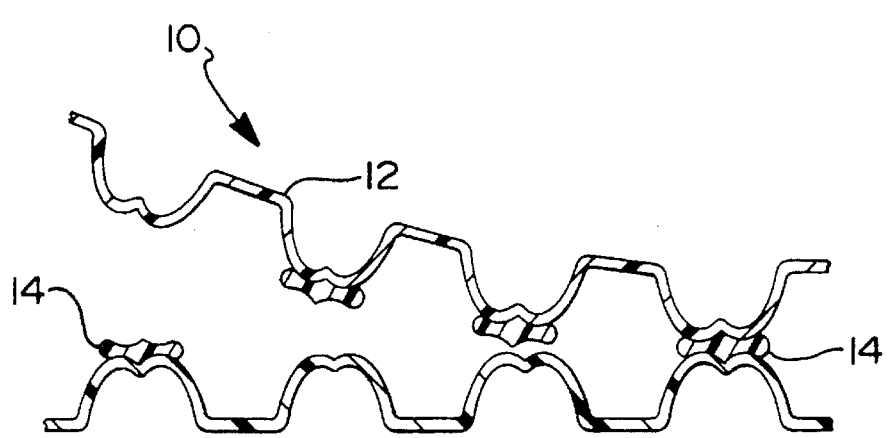
FIG 3

PROCESS FOR BINDING DRAIN TILE

BACKGROUND OF THE INVENTION

1. Field of the Invention

The present invention concerns elongated sections of tubular housing or piping. More particularly, the present invention concerns methods of binding elongated sections of tubular hosing or piping. Even more particularly, the present invention concerns methods of binding coiled sections of elongated piping.

2. Prior Art

As is known to those skilled in the art to which the present invention pertains, traditionally, elongated sections of rubber and plastic hosing, piping and the like are provided to the purchasing public in coils. Customarily, these coils are bound and held together, in the coil, through string, rope, steel bands and the like. However, because of the elastic memory, when the binding is loosened the elongated section uncoils and tends to return to its lineal figuration. This makes the deployment of the coil difficult and cumbersome, since it is virtually impossible to recoil or rewind the hosing.

This need to recoil to the entire length or section is especially disconcerting when only a small section of the coil is desired.

Heretofore, and to the best of applicant's knowledge, the prior art has not addressed a solution to overcoming this problem.

As will be subsequently detailed, the present invention addresses this problem.

SUMMARY OF THE INVENTION

In accordance with the present invention there is provided a method of bundling or coiling an elongated, hollow, cylindrical member which comprises:

(a) coiling the member; and (b) substantially contemporaneously with the coiling, depositing an elongated bead of adhesive along the longitudinal extent of the member to removably bond the coil to itself.

In a preferred embodiment hereof corrugated drain tile or the like has an extruded small stream or bead of polyethylene deposited along the longitudinal extent thereof, at the time of coiling. The extruder deposits the bead which, because of hits heat bonds to the coil, such that the coil adheres to itself.

Upon cooling, there is a slight adhesive bond which exists along the extent of the coil. Thus, any desired section of coil can be "peeled off" from the entire coil.

In accordance herewith, it is contemplated that during extrusion of the coil itself, the nozzle of the extruder may drag along the exterior surface of the coil to thus prepare the surface for receiving the bead. In other words, a recess is formed on the surface in which the bead is deposited.

For a more complete understanding of the present invention reference is made to the following detailed description and accompanying drawing. In the drawing like reference characters refer to like parts throughout the several views in which:

BRIEF DESCRIPTION OF THE DRAWING

FIG. 1 is a perspective view of a coiled section of hollow tube;

FIG. 2 is a partial side view of a section of drain tile having an adhesive bead deposited therealong; and FIG. 3 is a partial cross-section view, showing the separation of a section of drain tile from the coil in accordance with the present invention.

DESCRIPTION OF THE PREFERRED EMBODIMENT

Now, and with reference to the drawing, there is depicted therein a coiled section of hollow, cylindrical tubing, generally denoted at 10. The present invention is particularly advantageous for use with drain tile 12 or similar elongated, flexible, hollow tubing.

Traditionally, and as herein above noted, and as shown, the tubing is extruded and coiled into elongated sections for ease of transportability and delivery.

In accordance with the present invention, a bead of adhesive 14 is deposited along the exterior extent of the drain tile 12. Preferably, the bead of adhesive 14 is deposited at the time of coiling, such that as the tubing 12 is coiled, it is adhered back onto itself. The adhesive provides a weak bonding of the coil along its extent. In this manner, essentially, any desired section of tubing can be "peeled" from the coil.

In a particularly preferred embodiment hereof, the present invention is desirably employed in connection with elongated coils of the drain tile 12. Drain tile, as is known to those skilled in the art to which the present invention pertains, is, typically extruded from polyethylene or similar synthetic resinous material.

It is contemplated in the practice of the present invention, that as the drain tile issues from an extruder, a bead 14 of the same synthetic resinous material is deposited along the extent of the drain tile 12. This bead can be deposited from a source of material disposed adjacent the extruder. Because of the peaks and ridges associated with the manufacture of the drain tile, the bead is deposited along the peaks or ridges. Thus, as the drain tile is coiled and wound back upon itself the ridges mate and the bead adhesively bonds one ridge to an opposed ridge, as shown.

Since the bead is warm material and the coil itself is warm, having come from the extruder, the bead of material is easily deposited onto the coil.

Preferably, where the drain tile is formed from polyethylene, the bead is, likewise, a polyethylene bead.

In a particularly preferred embodiment hereof, at the time of coiling the drain tile, a small stream of polyethylene is extruded onto the longitudinal extent of the coil. By employing an extruder, there is insured a warm bead being deposited onto the warm surface.

In a particularly preferred embodiment hereof, and as shown in the drawing, during the extrusion of the coil itself, the nozzle of the extruder is brought into contact with the exterior of the coil such that it "drags" along the surface. This creates a recess or cavitation along the surface of the coil into which the adhesive material can be deposited.

The use of the polyethylene provides a weak bond between the ridges such that the tube can be "peeled" from the coil, as shown in FIG. 3, by simple manual pressure.

By practicing the present invention, the difficulties encountered through the use of strings, ropes, steel bands and the like, is eliminated. The section of tubular hosing 10 remains in a coiled configuration and only that desired length of tubing is peeled off and used.

It should be noted with respect hereto that the preset invention enables a coil of drain tile or the like to maintain its integrity, i.e. it will maintain its roughness.

It is to be appreciated from the preceding that there has been described herein a process for binding coils of hollow tubular members and which is particularly advantageous in connection with drain tile.

Having thus described the invention, what is claimed is:

1. A method for binding a coil of hollow tubing comprising:

(a) forming a length of hollow tubing;
   (b) depositing an adhesive bead along the longitudinal extent of the tubing during the formation thereof;
   (c) coiling the tubing; and
   (d) contacting segments of the coiled tubing with the adhesive to releasably bond the tubing to itself.

2. The method of claim 1 wherein the tubing is a drain tile.

3. The method of claim 2 comprising:

extruding a stream of adhesive onto the exterior of the drain tile to deposit the adhesive, 4. The method of claim 3 wherein the drain tile is formed from polyethylene and the adhesive is a stream of polyethylene, 5. The method of claim 1 which further comprises:

(a) forming a recess along the extent of the tubing; and
   (b) depositing the bead in the recess.

* * * * *